United States Patent

Deveson et al.

[15] 3,637,937

[45] Jan. 25, 1972

[54] A TELECINE SYSTEM FOR PRODUCING VIDEO SIGNALS FROM FILM

[72] Inventors: John Harwood Deveson; Anthony John Butt, both of Essex, England

[73] Assignee: The Marconi Company Limited, London, England

[22] Filed: Sept. 10, 1969

[21] Appl. No.: 856,531

[30] Foreign Application Priority Data

Sept. 18, 1968 Great Britain ......................44,273/68

[52] U.S. Cl. ........................................178/7.2, 178/DIG. 28
[51] Int. Cl. ........................................................H04n 5/54
[58] Field of Search..................355/38, 68, 83; 178/DIG. 28, 178/DIG. 29, 5.2 D

[56] References Cited

UNITED STATES PATENTS

| | | | |
|---|---|---|---|
| 2,921,512 | 1/1960 | Craig | 355/83 |
| 2,985,086 | 5/1961 | Craig | 355/83 |
| 3,010,362 | 11/1961 | Smith | 178/7.2 E |
| 3,061,673 | 10/1962 | Fathauer et al. | 178/7.2 E |

*Primary Examiner*—Robert L. Richardson
*Assistant Examiner*—Donald E. Stout
*Attorney*—Baldwin, Wight & Brown

[57] ABSTRACT

In a telecine equipment variations in exposure of the film can be disturbing to viewers. This invention provides a compensation for such variations which may be effected within the time of a small number of television field scans and employs a peak signal detector for determining during operation peak signal amplitude occurring during a predetermined number of television fields and control means, which may vary the gain of the camera or video signal processing amplifier, operable for a subsequent predetermined number of fields for applying correction for any departure from a desired peak signal level.

12 Claims, 2 Drawing Figures

Figure 1:
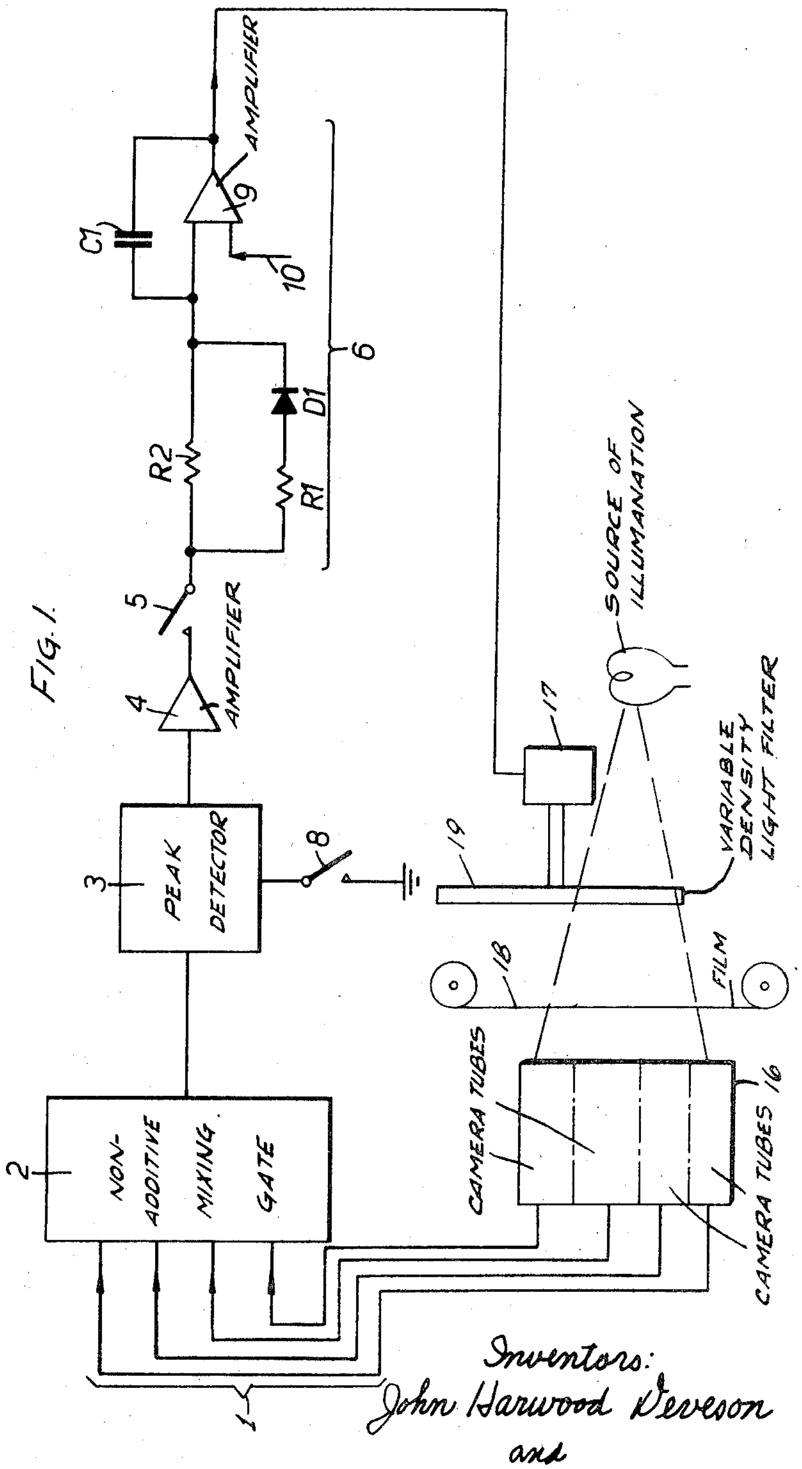

Inventors:
John Harwood Deveson
and
Anthony John Butt
BY
Baldwin Wight Diller & Brown
ATTORNEYS Inventors:
John Harwood Deveson
and
Anthony John Butt
BY
Baldwin Wight Diller & Brown
ATTORNEYS

A TELECINE SYSTEM FOR PRODUCING VIDEO SIGNALS FROM FILM

The present invention relates to telecine equipment, i.e., equipment for producing television signals representative of the information contained on photographic film.

The film may be in the form of slides or in a continuous reel each slide or each frame on the reel being illuminated and viewed by a television camera which produces the representative television signals. Some slides or film frames, however, may have been produced using an incorrect exposure time or camera lens aperture and as a result will be over or under exposed. If the film is overexposed then with the same light source the film will pass more light to the television camera than will a correctly exposed film using the same source and conversely an underexposed film will pass less light to the camera. This would be very disturbing to a viewer, the high-intensity signals from the overexposed film being the most objectionable.

The applicants are aware of two prior proposals for overcoming this problem. The first proposal comprises varying the gain of the amplifier in the television camera to ensure that peak signals are always amplified to the same amplitude, i.e., in a practical case peak level in the signals representing a scene being viewed is raised to that of true white. The second proposal utilizes a fixed optimum gain amplifier and employs a variable density light filter between a light source and the film to control the illumination of the film, the illumination being so chosen that the peak signal at the output corresponding to the brightest part of the scene has the same amplitude as true white. Control of the portion of the variable density light filter between the light source and the film is effected by a servomotor fed by a peak detector, the two together forming a closed feedback loop for the system. In this latter system and the variable amplifier gain system, both of which effectively employ direct feedback control, the response of the system has to be made relatively slow, of the order of second, since otherwise the illumination of the film or the amplifier gain would vary continuously and markedly during the scanning of one field and the signal would thus be substantially demodulated. The invention seeks to provide telecine equipment with which substantial compensation may be effected within the time occupied by only a few television field scans and which does not introduce the above-mentioned demodulation effect.

According to this invention a telecine equipment comprises a television camera arranged to televise cinematograph film to produce video signals; a light source for illuminating the film; a peak signal detector for determining during operation peak signal amplitude occurring in the video signals during a predetermined number of television fields; and control means operable for a subsequent predetermined number of television fields for applying correction for any departure from a desired peak signal level detected by said peak signal detector during said predetermined number of television fields. Said control means may apply correction by varying the gain of the camera or video signal processing amplifier. Preferably, however, the aforesaid light source is a variable intensity light source and said control means apply correction by varying the illumination provided thereby.

In one way of carrying out the invention the detected peak signal level corresponds with white. In another way of carrying out the invention said level corresponds with black.

Preferably said variable intensity light source comprises a source of fixed value and a graded density light filter, the positioning of which determines the degree of illumination of the film.

In a preferred embodiment of the invention said control means comprises an integrator, connected through a switch to the output of said peak detector and a positional servosystem arranged to be controlled by the output of said integrator for varying said light source; said switch is closed during a field blanking period so that the peak detector output is fed to the integrator; the switch is then opened and the servomotor moves to the new position demanded by the integrator output for said subsequent predetermined number of fields.

Preferably means are provided to reset said peak detector circuit during the field blanking period immediately prior to the first of said predetermined number of fields for which detection is effected.

To enable fast response of the correction system said predetermined number and subsequent predetermined number should each comprise only a single or at most a few fields. In the preferred embodiment they each comprise two fields.

Preferably the charging time of said integrator is shorter for increases in said peak signal level than for decreases so that overexposures are corrected far more rapidly than underexposures. If this is done information varying at a low frequency, e.g., a scene including a flashing neon sign at nights, is not demodulated. A suitable form of integrator for this purpose has two parallel resistive paths to form the resistive component of said integrator with one of said paths including a unilaterally conductive device so connected that it is forward biassed for increases in peak signal level but reverse biassed for decreases in peak signal level.

In the preferred embodiment of the invention the circuit is so designed that the light intensity is varied to produce a 90 percent correction for overexposure in said two subsequent fields.

Preferably a telecine equipment for producing color television signals from color film further includes gating means connected between the camera and said peak signal detector, the gating means being such that only the signal corresponding to the largest amplitude signal at any instant of the color and luminance input signals is passed to said peak detector circuit.

The invention is illustrated in the accompanying drawings. These figures illustrate two embodiments and each shows a telecine exposure correction system in accordance with the invention.

The arrangement shown in FIG. 1 forms part of a telecine equipment for producing color television signals representative of information recorded on color film. In addition to the part shown in the telecine equipment comprises a color camera, means for locating a film to be viewed by the camera and a light source for illuminating the film. Variation of illumination of the film is effected by a light filter of variable density and a positional servosystem which controls the position of the filter, these elements also not being shown. Any suitable filter may be used but one convenient filter comprises a circular disc the density of which varies angularly so that the illumination of the film may be varied by rotation of the disc to bring a different portion of the disc between the constant level light source and the film, the filter and the constant level light source together constituting a variable intensity light source. For a color system the filter has to be so designed that each color component is attenuated by the same amount, i.e., the filter is a neutral density filter.

The apparatus to be described and which is illustrated in FIG. 1 operates automatically so to adjust the output signals of the telecine equipment that the peak output amplitude corresponds to true white this result being achieved by varying the illumination by the light source of the film. The correction equipment shown in FIG. 1 is used to produce a variation in the light source illumination to compensate for any departure from this desired peak output level caused by the film being under or overexposed.

Referring to FIG. 1 each of the four inputs 1, is arranged to receive one of the four outputs (three color and one luminance) of the telecine color camera 16. Each feeds into a nonadditive mixing (NAM) gate 2, known per se, the output of which is at any instant equal in amplitude to the largest of the input signals. This output is fed to a peak detector 3 which in turn feeds its output via an amplifier 4 and a switch 5 to an integrator 6 consisting of the combination of parts indicated by the bracket to which the reference 6 is applied. The output of the integrator 6 is fed from the output terminal 7 to the servo 17 for varying the illumination of the film 18 using a variable density light filter 19 as described above. The servosystem 17 may be constructed as the positional servomechanism disclosed in the U.S. Pat. No. 3,010,362 to Smith which shows a servoamplifier coupled to a servomotor, the servomotor being operatively arranged to rotate a variable density filter in the form of a disk. The integrator 6 is of a kind, well known in the analogue computer art, employing a high-gain amplifier, 9, with a feedback capacitor, C1 connected, between its input and output and with an input series resistance. In this case the input resistance is formed by two parallel connected paths, one comprising a resistance R1 and diode D1 in series and the other a resistance R2. The amplifier 9 also has a peak white reference voltage level input 10.

The peak detector 3 has a reset switch 8 in a discharge path to earth whereby the peak detector 3 may be reset to zero.

The arrangement functions as follows:

The three color signals and the luminance signal from the color television camera 16 are applied to the NAM-gate 2 and a signal equal to the instantaneously highest of these four input signals appears at the output of the gate 2. Assuming that the peak detector 3 has just been reset to zero, this output signal is applied to the peak detector 3 for two field periods with both the switches 5 and 8 open. The peak 3 then has an output corresponding to the peak signal occuring during those two periods. During the subsequent field blanking time the switch 5 is closed and current flows through the resistive input of the integrator 6 to charge the capacitor C1 in a direction and to an amount depending upon the difference between the peak white reference amplitude and the peak signal recorded by the peak detector 3.

The integrator output at the end of the field blanking period is, therefore, a measure of the position to which the servo 17 must move the variable density light filter 19 to cancel the difference between the measured peak signal and the desired reference level. Two fields after the blanking period during which switch 5 is closed are allowed for the servo 17 to take up its new position. During the next field blanking period switch 8 is closed to reset the peak detector 3 and the whole cycle is repeated.

Figure 2:
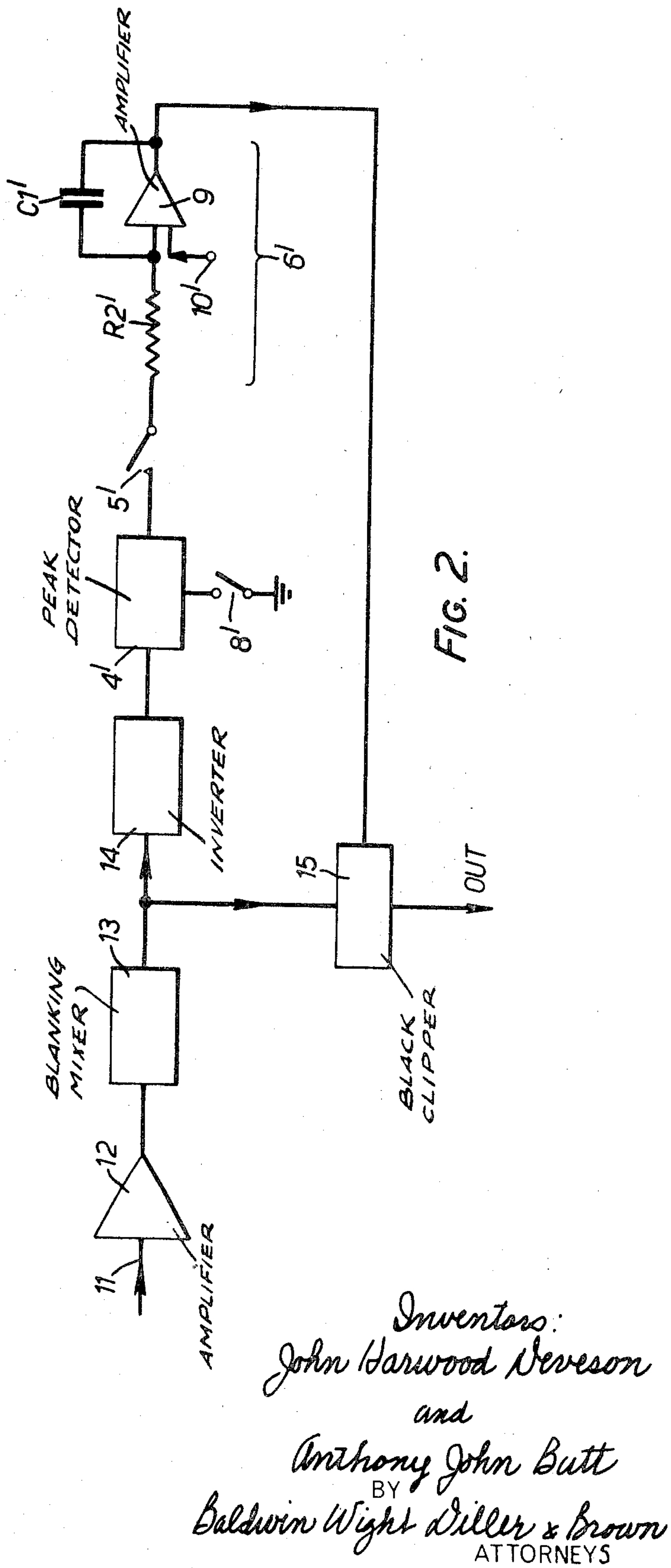

The arrangement is so designed that signals of greater amplitude than the reference level correspond to film 18 overexposure and vice versa. If the peak level recorded is higher than the reference amplitude then diode D1 will be forward biassed and the integrator 6 resistive path constituted by R2 and R1 in parallel. If the peak level is lower than the reference level the diode D1 is reverse biased and the integrator 6 resistive path is constituted solely by the resistor R2. The resistor R2 is made much larger than R1 so that for peak signals larger than the reference value the integrator 6 has a much more rapid response than for signals lower than the reference. Thus the integrator 6 will control the servo 17 to produce faster corrective action for an overexposure than for an underexposure. To give a practical case the feedback loop gain may be such that overexposures are 90 percent corrected during one correction cycle, i.e., during four field periods. The slower correction of underexposure allows for low-frequency information such as a slow flashing neon signal in a night scene. If the speed of response for underexposures were high then the illumination would be incorrectly increased between flashes, thereby partially demodulating the picture information. FIG. 2 is a simplified block diagram of a modification of the invention in which the black level of the luminance signal component in a color telecine camera channel is stabilized.

Referring to FIG. 2 the input 11 is arranged to receive a luminance video signal from the telecine color camera (not shown). This signal is amplified by an amplifier 12 and blanked in a blanking mixer as known per se represented simply by the block referenced 13. The blanking mixer 13 serves to combine an incoming video signal with a blanking signal in a manner well known in the television art. The mixing function is described, for example, in the book *Television Engineering Handbook* by D. G. Fink, pages 8–42 to 8–45, McGraw Hill, London and New York (1957). The output from blanking mixer 13 is inverted by an inverter 14 and the black level measured by a peak detector 4' with which is associated a resetting switch 8'. The measured black level is fed through switch 5' to an integrator 6' comprising resistance $R_2$; and amplifier 9' with its feedback capacitor C1' and reference voltage level input 10', the reference voltage level of course corresponding with black. The parts 4', 5', 6', 8', 9', 10', R2' and C1' are similar in function to the parts 4, 5, 6, 8, 9, 10, R2 and C1 of FIG. 1 but, of course, in FIG. 2 they are used to receive stabilization of black level whereas the corresponding parts in FIG. 1 are used to stabilize white level. In FIG. 2 the measured black level is compared with the reference level (fed in to the integrator at 10') once every four fields by closing switch 5'. The resulting correcting DC voltage may be used, as also shown in FIG. 2, to control the clipping level of a known black clipper 15 fed with output from the blanking mixer 13, thus stabilizing the black level of the output signal which is fed over lead OUT for processing in the ordinary way by the customary camera control unit circuitry (not shown).

It will be seen that the invention enables a relatively fast correction for what would otherwise be very disturbing film overexposures to be effected without the demodulation that would occur in an equally fast continuous direct feedback control system. This advantage is obtained whether the correction is effected by light control (as illustrated) or by varying the amplifier gain (as mentioned hereinbefore). However correction by varying amplifier gain does to a certain extent degrade the signal to noise ratio and, therefore, if a suitable variable intensity light source is available, correction by control of illumination is in general preferable.

We claim:

1. A telecine system comprising a television camera arranged to televise cinematograph film to produce video signals; a light source for illuminating the film; a peak signal detector operable during a first predetermined number of television fields and inoperative during a subsequent predetermined number of television fields for determining peak signal amplitude occurring in the video signals during said first predetermined number of television fields; control means including means for detecting a departure of said detected peak signal amplitude from a desired peak signal level, said control means comprising an integrator connected through a switch to the output of said peak signal detector, said switch being closable during a field blanking period so that the peak detector output is fed to the integrator and said switch being operable during said subsequent predetermined number of fields; and correction means operable for said subsequent predetermined number of television fields during which a correction signal is applied to the system for correcting for the departure of said detected peak signal amplitude from the desired peak signal level, whereby no correction signal is applied to the system during said first predetermined number of television fields.

2. The system as claimed in claim 1 wherein the correction means develop a correction signal suitable for varying the gain of an amplifier employed for amplifying video signals in a video signal channel, and means for applying the correctional signal to said amplifier.

3. The system as claimed in claim 1 wherein the correcting means apply correction by varying the light illuminating the film.

4. The system as claimed in claim 1 wherein the peak signal detector is operatively arranged to detect peak signal level corresponding with white.

5. The system as claimed in claim 1 wherein the peak signal detector is operatively arranged to detect peak signal level corresponding with black.

6. The system as claimed in claim 3 wherein the light illuminating the film is provided by a variable light source comprising a fixed intensity light source and an associated movable light filter having different parts of different density, variation of the light illuminating the film being effected by moving the filter in relation to the fixed intensity light source to vary the part of said filter interposed between said fixed intensity light source and the film.

7. The system as claimed in claim 1 wherein means are provided to reset said peak detector circuit during the field blanking period immediately prior to the first of said predetermined number of fields for which detection is effected.

8. The system as claimed in claim 1 wherein said predetermined number and subsequent predetermined number each comprise two fields.

9. The system as claimed in claim 1 wherein the charging time of said integrator is shorter for increases in said peak signal level than for decreases so that overexposures are corrected for more rapidly than underexposures.

10. The system as claimed in claim 9 wherein the integrator includes two parallel resistive paths to form the resistive component of said integrator with one of said paths including a unilaterally conductive device so connected that it is forward biased for increases in peak signal level but reverse biased for decreases in peak signal level.

11. The system as claimed in claim 1 for producing color television signals from color film and which includes a source of color television signals and gating means for selecting for application to the peak signal detector only the signal corresponding to the largest amplitude signal at any instant of color and luminance signals from said source of color television signals.

12. The system as claimed in claim 1 including means for comparing peak signal amplitude corresponding with black with a black level reference signal and for using the resultant of comparison to vary the clipping level in a black level clipper through which video signals are passed.

* * * * *